United States Patent Office 3,660,403
Patented May 2, 1972

3,660,403
HALOPHENYLPYRIMIDINE CARBOXYLIC ACIDS
Tsung-Ying Shen, Gordon L. Walford, and Bruce E. Witzel, Westfield, N.J., assignors to Merck & Co., Inc., Rahway, N.J.
No Drawing. Filed June 25, 1969, Ser. No. 836,647
Int. Cl. C07d 51/38
U.S. Cl. 260—251 R  4 Claims

ABSTRACT OF THE DISCLOSURE 2-halophenyl-4-(or 5)-hydroxy-5(or 4)-pyrimidinecarboxylic acids and certain derivatives having anti-inflammatory activity are described.

SUMMARY OF THE INVENTION

This invention describes aryl pyrimidine carboxylic acids and their derivatives, processes for preparing the same, and the method of treatment of these compounds as medicinal agents. The disclosed class of compounds in this invention exhibit anti-inflammatory properties and are effective for the prevention and inhibition of edema and granuloma tissue formation.

BACKGROUND OF THE INVENTION

Despite all the research carried on in the development of anti-inflammatory drugs in the past two decades, our knowledge of inflammation remains largely descriptive and we still have little progress; however, we have seen the growth of a great many new drugs. Most of these have been steroids of the 11-oxygenated pregnane series. These, while effective, are complex in structure. There is a need in the market for equally effective compounds of simpler structure.

We have found that the aryl pyrimidine acids of this invention are effective non-steroidal anti-inflammatory agents.

DESCRIPTION AND PREFERRED EMBODIMENTS

This invention relates to new chemical compounds which contain an aryl or substituted aryl radical attached to a pyrimidine ring bearing a carboxylic acid group and a hydroxy group which are ortho to each other and one of which is para to the aryl radical. This invention further relates to the non-toxic pharmaceutically acceptable salts, esters and amides of these carboxylic acids. Included also in this invention are the methods of preparation and treatment as medicinal agents for the disclosed compounds.

The scope of this invention embraces the following types of compounds:

(A) 2-aryl-5-hydroxy-4-pyrimidine carboxylic acid
(B) 2-aryl-4-hydroxy-5-pyrimidine carboxylic acid The compounds of this invention may be described by the following general formula

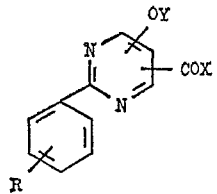

where

—COX and —OY are ortho to each other and one of them is para to the phenyl group, and where
R is alkyl (preferably lower alkyl such as methyl, ethyl, propyl, i-propyl, etc.), halogen (preferably fluoro and chloro), hydroxy, alkoxy (preferably lower alkoxy such as methoxy, ethoxy, etc.), alkylthio (preferably lower alkylthio such as methylthio, ethylthio, etc.), alkylsulfonyl (preferably lower alkylsulfonyl such as methylsulfonyl), alkylsulfinyl (preferably lower alkylsulfinyl such as methylsulfinyl), X is hydroxy, amino, alkylamino (preferably lower alkylamino such as methylamino, ethylamino, etc.), dialkylamino (preferably dilower alkylamino such as dimethylamino, methylethylamino, etc.), cycloalkylamino, alkoxy (preferably lower alkoxy such as methoxy, ethoxy, etc.), and OM, where M in general is any base which will form an acid addition salt with a carboxylic acid and whose pharmaceutical properties will not cause an adverse physiological effect when ingested by the body system [preferably an alkali, or alkaline earth metal (such as sodium, potassium, calcium, and magnesium) or aluminum]; and Y is hydrogen, alkyl (preferably lower alkyl such as methyl, ethyl, propyl i-propyl, butyl, s-butyl, t-butyl, etc.), alkenyl (preferably lower alkenyl such as allyl, vinyl, methallyl, etc.), aralkyl (preferably benzyl or phenethyl), aryl (preferably phenyl), acyl (preferably acetyl, propionyl, benzoyl, etc.).

We have found that the compounds of this invention have a useful degree of anti-inflammatory activity and are effective in the treatment of arthritic and dermatological disorders and in like conditions which are responsive to treatment with anti-inflammatory agents. For these purposes, they may be administered orally, topically, parenterally or rectally. Orally, they may be administered in tablets or capsules, the optimum dosage depending, of course, on the particular compound being used and the type and severity of the condition being treated. Although the optimum quantities of the compounds of this invention to be used in such manner will depend on the compound employed and the particular type of disease condition treated, oral dose levels of preferred compounds in the range of 1–100 mg./kg. per day (preferably in the range of 2–50 mg./kg. per day) are useful in control or arthritic conditions, depending on the activity of the specific compound and the reaction sensitivity of the patient. Comparative dosages may be used in topical, parenteral, or rectal administration.

The pyrimidine carboxylic acids of this invention are prepared by the methods below. Each method of preparation is described and followed by the specific reaction equation. It further contains a reference where that method may be found in the examples of the invention.

(A) 2-aryl-5-hydroxy-4-pyrimidinecarboxylic acid

Reaction of a substituted benzamidine with glyoxal in alkaline solution followed by treatment of the formed glyoxal-amidine addition product with glyoxylic acid in basic medium results in the formation of a 2-aryl-5-hydroxy-4-pyrimidinecarboxylic acid (Example 8).

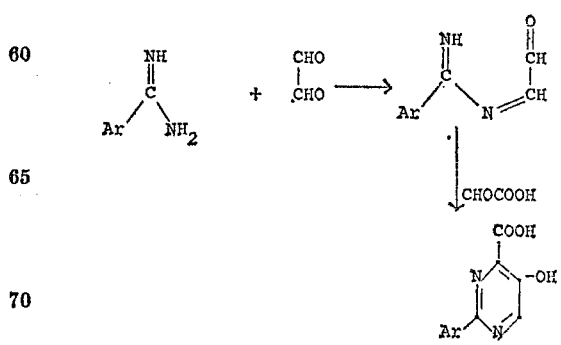

The 2-aryl-5-hydroxy-4-pyrimidinecarboxylic acids can be converted to the corresponding esters and amides by conventional methods. The 5-hydroxy group can also be converted to the desired derivative by conventional methods.

(B) 2-aryl-4-hydroxy-5-pyrimidinecarboxylic acid

When a substituted benzamidine is reacted with a dialkyl piperidylmethylenemalonate in a metal alkoxide medium, the product obtained is an alkyl 2-aryl-4-hydroxy-5-pyrimidinecarboxylate. This is then hydrolyzed in base to the corresponding carboxylic acid (Examples 9 and 10).

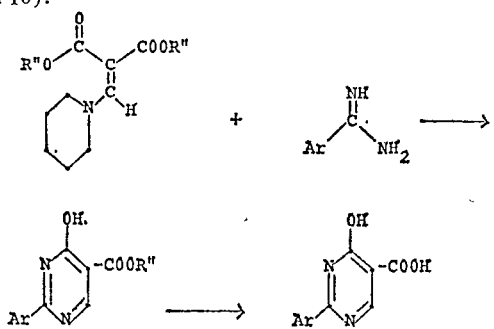

where R" is alkyl.

A further method of preparation is the use of a dialkyl morpholinylmethylenemalonate, dialkyl ethoxymethylenemalonate or alkyl metal-$\alpha,\gamma$-dicarboxyglutaconate in place of the dialkyl piperidylmethylenemalonate in the above synthesis.

Aromatic benzamidines when condensed with an alkyl alkoxymethylenecyanoacetate in metal alkoxide media result in 5-cyano-2-aryl-4-hydroxypyrimidines. These are then hydrolyzed to the 2-aryl-4-hydroxy-5-pyrimidinecarboxylic acids by mineral acids. (Examples 11 and 12.)

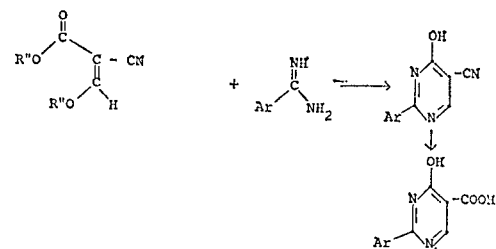

The 2-aryl-4-hydroxy-5-pyrimidinecarboxylic acids can be converted to the corresponding esters and amides by conventional methods. The 4-hydroxy group can also be converted to the desired derivative by conventional methods.

The starting materials of this invention are either known compounds or the method of preparing them has been incorporated into the appropriate example.

The following are detailed examples which show the preparation of the various compounds described in this invention. They are to be construed as illustrations of said compounds and not as limitations thereof.

EXAMPLE 1

2-(p-fluorophenyl)-5-hydroxy-4-pyrimidinecarboxylic acid (A) A saturated (below 5°) aqueous solution of p-fluorobenzimidine hydrochloride (prepared by the procedure outlined in C.A. 50:15546) is treated with an equimolar quantity of a 40% aqueous solution of glyoxal, and the solution rendered alkaline to litmus by the addition of aqueous 50% potassium hydroxide. After 15 minutes, the crystalline addition product is collected by filtration, washed thoroughly with ice-water, and dried in vacuo over sulfuric acid.

(B) A solution of the glyoxal-amidine additional product in ethanol (50 ml./g.) is treated with a 10–20% excess of glyoxylic acid and with aqueous 50% potassium hydroxide (5 ml./g.). The flask is tightly stoppered, and allowed to stand for several days at room temperature.

The solution is made slightly acid with acetic acid, and the precipitated 2-(p-fluorophenyl)-5-hydroxy - 4 - pyrimidinecarboxylic acid collected by filtration. The product is purified by recrystallization from aqueous ethanol.

When the aromatic amidines of Table VIII below are used in place of p-fluorobenzamidine in the preceding example, the corresponding 2-aryl-5-hydroxy-4-pyrimidinecarboxylic acids of Table XI below are obtained.

TABLE VIII o-chlorobenzamidine
p-chlorobenzamidine
m-nitrobenzamidine
p-nitrobenzamidine
3,4-dimethylbenzamidine
p-dimethylaminobenzamidine
p-(methylsulfonyl)benzamidine
3,5-dibromobenzamidine
2,6-dichlorobenzamidine
3,4,5-trimethoxybenzamidine
p-(butylthio)benzamidine
p-(methylthio)benzamidine
p-phenoxybenzamidine

TABLE IX 2-(o-chlorophenyl)-5-hydroxy-4-pyrimidinecarboxylic acid
2-(p-chlorophenyl)-5-hydroxy-4-pyrimidinecarboxylic acid
2-(m-nitrophenyl)-5-hydroxy-4-pyrimidinecarboxylic acid
2-(p-nitrophenyl)-5-hydroxy-4-pyrimidinecarboxylic acid
2-(3,4-dimethylphenyl)-5-hydroxy-4-pyrimidinecarboxylic acid
2-(p-dimethylaminophenyl)-5-hydroxy-4-pyrimidinecarboxylic acid
2-[p-(methylsulfonyl)phenyl]-5-hydroxy-4-pyrimidinecarboxylic acid
2-(3,5-dibromophenyl)-5-hydroxy-4-pyrimidinecarboxylic acid
2-(2,6-dichlorophenyl)-5-hydroxy-4-pyrimidinecarboxylic acid
2-(3,4,5-trimethoxyphenyl)-5-hydroxy-4-pyrimidinecarboxylic acid
2-[p-(butylthio)phenyl]-5-hydroxy-4-pyrimidinecarboxylic acid
2-[p-(methylthio)phenyl]-5-hydroxy-4-pyrimidinecarboxlic acid
2-(p-phenoxyphenyl)-5-hydroxy-4-pyrimidinecarboxylic acid

EXAMPLE 2

Ethyl 2-(p-fluorophenyl))-4-hydroxy-5-pyrimidinecarboxylate

A solution of sodium (1.38 g., 0.06 g.-atom) in absolute ethanol (100 ml.) is treated with p-fluorobenzamidine hydrochloride (7.0 g., 0.04 mole) and diethyl piperidylmethylenemalonate [prepared by the procedure outlined by A. A. Santilli, W. F. Bruce and T. S. Osdene, J. Med. Chem., 7, 68 (1964)] (5.1 g., 0.02 mole). The reaction mixture is then heated under reflux with stirring for 2 hours.

The mixture is filtered, ethanol removed from the filtrate by evaporation in vacuo, and the residue acidified with acetic acid. The precipitated ethyl 2-(p-fluorophenyl)-4-hyrdroxy-5-pyrimidinecarboxylate is collected by filtration, and purified by recrystallization from ethanol.

When the aromatic amidines of Example 1 (Table VIII) are used in place of p-fluorobenzamidine in the above example, the corresponding 2-aryl-5-carboethoxy-4-hydroxypyrimidines are obtained.

Diethyl piperidylmethylenemalonate may be replaced in the above example by diethyl morpholinylmethylenemalonate (prepared by the procedure of A. A. Santilli, et al.), diethyl ethoxymethylenemalonate, or ethyl sodio-$\alpha,\gamma$-dicarboxyglutaconate. [The latter compounds prepared by the procedure outlined by P. C. Mitten and J. C. Bardhan, J. Chem. Soc., 123, 2179 (1923).]

EXAMPLE 3

2-(p-fluorophenyl)-4-hydroxy-5-pyrimidinecarboxylic acid

Ethyl 2-(p-fluorophenyl)-4-hydroxy - 5 - pyrimidinecarboxylate (2.6 g., 0.01 mole) is treated with a solution of potassium hydroxide (0.7 g., 0.0125 mole) in alcohol (12.5 ml.) for 5 hours under reflux.

The solution is then evaporated to dryness in vacuo, and the residue taken up in water (25 ml.). The aqueous solution is filtered, the filtrate acidified with hydrochloric acid, and the precipitated 2-(p-fluorophenyl)-4-hydroxy-5-pyrimidinecarboxylic acid collected by filtration and washed thoroughly with water. The product is purified by recrystallization from alcohol.

When the 2-aryl-5-carboethoxy-4 - hydroxypyrimidines of Example 2 are used in the above example in place of ethyl 2-(p-fluorophenyl)-4-hydroxy-5-pyrimidinecarboxylate, the corresponding 2-aryl-4-hydroxy - 5 - pyrimidinecarboxylic acids of Table X below are obtained.

Table X 2-(o-chlorophenyl)-4-hydroxy-5-pyrimidinecarboxylic acid
2-(p-chlorophenyl)-4-hydroxy-5-pyrimidinecarboxylic acid
2-(m-nitrophenyl)-4-hydroxy-5-pyrimidinecarboxylic acid
2-(p-nitrophenyl)-4-hydroxy-5-pyrimidinecarboxylic acid
2-(3,4-dimethylphenyl)-4-hydroxy-5-pyrimidinecarboxyic acid
2-(p-dimethylaminophenyl)-4-hydroxy-5-pyrimidinecarboxylic acid
2-[p-(methylsulfonyl)phenyl]-4-hydroxy-5-pyrimidinecarboxylic acid
2-(3,5-dibromophenyl)-4-hydroxy-5-pyrimidinecarboxylic acid
2-(2,6-dichlorophenyl)-4-hydroxy-5-pyrimidinecarboxylic acid
2-(3,4,5-trimethoxyphenyl)-4-hydroxy-5-pyrimidinecarboxylic acid
2-[p-(butylthio)phenyl]-4-hydroxy-5-pyrimidinecarboxylic acid
2-[p-methylthio)phenyl]-4-hydroxy-5-pyrimidinecarboxylic acid
2-(p-phenoxyphenyl)-4-hydroxy-5-pyrimidinecarboxylic acid

EXAMPLE 4

5-cyano-2-(p-fluorophenyl)-4-hydroxypyrimidine

A solution of sodium (805 mg., 0.035 g.-atom) in absolute ethanol (100 ml.) is treated first with p-fluorobenzamidine hydrochloride (2.4 g., 0.014 mole), and then, after a few minutes, with ethyl ethoxymethylenecyanoacetate (2.4 g., 0.014 mole). The reaction mixture is heated under reflux with stirring for 2 hours, and then allowed to stand overnight at room temperature.

Water (50 ml.) is added, and the mixture neutralized with acetic acid. The precipitate of 5-cyano-2-(p-fluorophenyl)-4-hydroxypyrimidine is collected by filtration and purified by dissolution in concentrated ammonium hydroxide, followed by acidification with acetic acid.

When the aromatic amidines of Example 1 (Table VIII) are used in place of p-fluorobenzamidine in this example, the corresponding 2 - aryl-5-cyano-4-hydroxypyrimidines are obtained.

EXAMPLE 5

2-(p-fluorophenyl)-4-hydroxy-5-pyrimidinecarboxylic acid

A mixture of 5 - cyano-2-(p-fluorophenyl)-4-hydroxypyrimidine (2.2 g., 0.01 mole) and concentrated hydrochloric acid (10 ml.) is heated under reflux for 3 hours. It is then allowed to cool, and poured on cracked ice (ca. 50 g.). The precipitate is collected by filtration, and washed thoroughly with cold water.

The precipitate is treated with a slight excess of aqueous 10% sodium hydroxide, the solution filtered, and the filtrate acidified with hydrochloric acid giving 2-(p-fluorophenyl)-4-hydroxy - 5 - pyrimidinecarboxylic acid. The product is collected by filtration, washed with water, and recrystallized from alcohol.

When the 2-aryl-5-cyano-4-hydroxypyrimidines of Example 11 are used in place of 5-cyano-2-(p-fluorophenyl)-4-hydroxypyrimidine in the preceding example, the corresponding 2-aryl-4-hydroxy-5-pyrimidinecarboxylic acids of Table X are obtained.

PREPARATION OF ESTERS 4-carbomethoxy-2-(p-fluorophenyl)-5-hydroxypyrimidine

To a mixture of 2-(p-fluorophenyl)-5-hydroxy-4-pyrimidinecarboxylic acid (3.5 g., 0.015 mole) and absolute methanol (4.8 g. ≡6.1 ml., 0.15 mole) is added slowly, with stirring, concentrated sulfuric acid (0.6 ml.). The mixture is then heated under reflux for 8 hours.

Excess methanol is removed by evaporation in vacuo, and the residue is treated, with stirring, with ice-water (25 ml.). 4-carbomethoxy-2-(p-fluorophenyl)-5-hydroxypyrimidine is collected by filtration, washed thoroughly with cold water, and dried. It is purified by recrystallization from aqueous alcohol.

When the 2-(p-fluorophenyl)-5-hydroxy-4-pyrimidinecarboxylic acid of the above procedure is replaced by any of the carboxylic acid compounds of this invention, the corresponding methyl ester is prepared.

When the methanol in the above procedure is replaced by other appropriate alcohols such as ethanol, propanol, isopropanol, butanol, isobutanol, t-butanol, 2-methoxyethanol or 2-ethoxyethanol, the corresponding ester is prepared. A representative list of the esters thus prepared is shown below.

Methyl 2-(3,4,5-trimethoxyphenyl)-5-methoxy-4-pyrimidinecarboxylate
i-Propyl 2-(p-fluorophenyl)-4-acetoxy-5-pyrimidinecarboxylate
Methyl 2-(p-fluorophenyl)-4-hydroxy-5-pyrimidinecarboxylate
t-Butyl 2-(2,6-dichlorophenyl)-4-methoxy-5-pyrimidinecarboxylate
Methyl 2-(p-dimethylaminophenyl)-4-hydroxy-5-pyrimidinecarboxylate
Methyl 2-[p-methylsulfonyl)phenyl]-4-hydroxy-5-pyrimidinecarboxylate

PREPARATION OF ALKOXY DERIVATIVES

2-(p-fluorophenyl)-5-methoxy-4-pyrimidinecarboxylic acid 4- carbomethoxy - 2 - (p-fluorophenyl)-5-hydroxypyrimidine (2.5 g., 0.010 mole), sodium (230 mg., 0.010 g.-atom) in anhydrous methanol (10 ml.), and methyl iodide (1.6 g., 0.011 mole) are heated together under reflux for several hours. Methanol is removed by evaporation in vacuo, and the residue is treated with water (25 ml.). The mixture is rendered alkaline with sodium hydroxide to ensure dissolution of unaltered starting material, and then is extracted with ether (2× 25 ml.). The combined ethereal extracts are dried over anhydrous magnesium sulfate, and evaporated in vacuo to give 4-carbomethoxy-2-(p-fluorophenyl)-5-methoxypyrimidine.

The methoxy ester is hydrolyzed with alcoholic potassium hydroxide by the procedure of Example 10 to give 2-(p-fluorophenyl)-5-methoxy - 4 - pyrimidinecarboxylic acid.

The procedure outlined in the preceding example may be applied to the preparation of other alkoxy carboxylic acids by substituting the appropriate hydroxy carboxylic acid ester for 4-carbomethoxy-2-(p-fluorophenyl)-5-hydroxypyrimidine, and the appropriate alkyl halide for methyl iodide. A representative list of products is shown below.

2-(p-chlorophenyl)-5-benzyloxy-4-pyrimidinecarboxylic acid
2-(3,4-dimethylphenyl)-5-methoxy-4-pyrimidinecarboxylic acid
2-(2,6-dichlorophenyl)-5-allyloxy-4-pyrimidinecarboxylic acid
2-[p-(methylsulfonyl)phenyl]-5-phenethoxy-4-pyrimidinecarboxylic acid
2-[p-(methylthio)phenyl]-5-methoxy-4-pyrimidinecarboxylic acid

4-Ethoxy-2-(p-fluorophenyl)-5-pyrimidinecarboxylic acid (A) Ethyl 4-chloro - 2 - (p-fluorophenyl) - 5 - pyrimidine carboxylate.—3-(p-fluorophenyl) - 4 - hydroxy-5-pyrimidine carboxylic acid (14.3 g., 0.05 mole) is treated with phosphorus oxychloride (20 g., 0.13 mole). To the mixture, finely pulverized phosphorus pentachloride (21 g., 0.10 mole) is added in small portions. Once the evolution of hydrogen chloride has substided, the mixture is warmed on the steam-bath for 1 hour.

Excess phosphorus oxychloride is removed by evaporation in vacuo, and the residual syrup is poured onto cracked ice (ca. 50 g.). The mixture is extracted with chloroform (3× 50 ml.), the combined extracts washed with water, dried over anhydrous sodium sulfate, filtered, and evaporated to give ethyl 4-chloro - 2 - (p-fluorophenyl)-5-pyrimidine carboxylate.

(B) Ethyl 4 - ethoxy - 2 - (p-fluorophenyl) - 5 - pyrimidine carboxylate.—To a solution of sodium (2.3 g., 0.10 g. atom) in absolute ethanol (100 ml.) is added ethyl 4-chloro - 2 - (p-fluorophenyl)-5-pyrimidine carboxylate (0.015 mole). The solution is refluxed for 1.5 hours. After neutralization by passing dry $CO_2$ gas and centrifugation, the resultant solution is evaporated to dryness under reduced pressure. The residue is taken up in water and extracted with ether. The ethereal layer is washed with water, dried over $Na_2SO_4$, and evaporated. Recrystallization of the residue from aqueous acetone gives ethyl 4 - ethoxy - 2 - (p-fluorophenyl) - 5 - pyrimidine carboxylate.

(C) 4 - ethoxy - 2 - (p-fluorophenyl) - 5 - pyrimidine carboxylic acid.—The ethoxy ester is hydrolyzed with alcoholic potassium hydroxide by the procedure of Example 3 to give 4 - ethoxy - 2 - (p - fluorophenyl)-5-pyrimidine carboxylic acid.

The procedure outlined in the preceding example may be applied to the preparation of other alkoxy carboxylic acids by substituting the appropriate hydroxy carboxylic acid ester. A representative list of the products is shown below.

2-(p-fluorophenyl)-5-methoxy-4-pyrimidinecarboxylic acid
2-(p-fluorophenyl)-4-methoxy-5-pyrimidinecarboxylic acid
2-(o-chlorophenyl)-4-methoxy-5-pyrimidinecarboxylic acid
2-(p-nitrophenyl)-4-ethoxy-5-pyrimidinecarboxylic acid
2-(p-fluorophenyl)-4-benzoyloxy-5-pyrimidinecarboxylic acid
2-(p-fluorophenyl)-4-allyloxy-5-pyrimidinecarboxylic acid
2-(3,4,5-trimethoxyphenyl)-4-methoxy-5-pyrimidinecarboxylic acid

PREPARATION OF ACYLOXY DERIVATIVES

5-acetoxy-2-(p-fluorophenyl)-4-pyrimidinecarboxylic acid 2-(p-fluorophenyl) - 5 - hydroxy - 4 - pyrimidinecarboxylic acid (3.5 g., 0.015 mole) is treated with acetic anhydride (3.1 g., 0.030 mole) and a catalytic amount of concentrated sulfuric acid (1 drop). The mixture is warmed on the steam-bath, with frequent agitation, for 30 minutes, and then is taken to dryness in vacuo to give 5 - acetoxy - 2 - (p-fluorophenyl)-4-pyrimidinecarboxylic acid.

When 2 - (p-fluorophenyl) - 5 - hydroxy - 4 - pyrimidinecarboxylic acid is replaced in the above example by any of the hydroxy carboxylic acids of this invention, the corresponding acetoxy carboxylic acid is prepared. A representative list of these products is shown below.

2-(p-fluorophenyl)-4-acetoxy-5-pyrimidine carboxylic acid
2-(3,4-dimethylphenyl)-5-acetoxy-4-pyrimidinecarboxylic acid
2-(p-methylsulfonylphenyl)-5-acetoxy-4-pyrimidinecarboxylic acid
2-(p-chlorophenyl)-5-acetoxy-4-pyrimidinecarboxylic acid
2-(3,4,5-trimethoxyphenyl)-5-acetoxy-4-pyrimidinecarboxylic acid
2-(3,4,5-trimethoxyphenyl)-4-acetoxy-5-pyrimidinecarboxylic acid
2-(p-nitrophenyl)-4-acetoxy-5-pyrimidinecarboxylic acid
2-(2,6-dichlorophenyl)-4-acetoxy-5-pyrimidinecarboxylic acid
2-(m-nitrophenyl)-4-acetoxy-5-pyrimidinecarboxylic acid When acetic anhydride is replaced in the above example by propionic anhydride, butyric anhydride, isobutyric anhydride, valeric anhydride, benzoic anhydride or phenylacetic anhydride, the corresponding acyloxy carboxylic acid is obtained.

PREPARATION OF AMIDES

2-(p-fluorophenyl)-4-hydroxy-5-pyrimidinecarboxamide

5 - carbomethoxy - 2 - (p-fluorophenyl) - 4 - hydroxypyrimidine (2.5 g., 0.010 mole) is refluxed for 1 hour with methanol (5 ml.) and concentrated ammonium hydroxide (15 ml.). Methanol (10 ml.) is added to the hot solution, which is then treated with charcoal, filtered, and chilled thoroughly. 2 - (p - fluorophenyl) - 4 - hydroxy - 5 - pyrimidinecarboxamide is collected by filtration, and recrystallized from aqueous slcohol.

When 5-carbomethoxy - 2 - (p-fluorophenyl-4-hydroxypyrimidine of the above procedure is replaced by any of the esters of this invention, the corresponding carboxamide is prepared.

N,N-diethyl 2-(p-fluorophenyl)-4-hydroxy-5-pyrimidinecarboxamide 2-(p - fluorophenyl)-4-hydroxy-5-pyrimidinecarboxylic acid (3.5 g., 0.015 mole) is added gradually to a refluxing solution of thionyl chloride (3.6 g., 0.03 mole) in benzene (15 ml.). When the addition is complete, refluxing is continued for 30 minutes.

The mixture is allowed to cool, and to it is added a solution of diethylamine (1.3 g., 0.018 mole) in benzene (15 ml.). The mixture is stirred thoroughly, warmed briefly on the steam-bath, and chilled, N,N-diethyl 2-(p-fluorophenyl)-4-hydroxy-5-pyrimidinecarboxamide is collected, and purified by recrystallization from aqueous alcohol.

When 2-(p - fluorophenyl)-4-hydroxy-5-pyrimidinecarboxylic acid of the above procedure is replaced by any of the carboxylic acids of this invention, the corresponding N,N-diethylcarboxamide is prepared.

When the diethylamine of the above example is replaced by other appropriate primary or secondary amines such as methylamine, ethylamine, methylethylamine, benzylamine, aniline, dimethylamine, dipropylamine, cyclopropylamine, cyclohexylamine, dibenzylamine, piperidine, morpholine, piperazine, homopiperazine or pyrrolidine, the corresponding amide is prepared. A representative list of amides thus prepared is shown below.

2-(p-fluorophenyl)-5-hydroxy-4-pyrimidine-
  carboxamide
2-(o-chlorophenyl)-5-acetoxy-4-pyrimidine-
  carboxamide
N,N-dimethyl 2-(p-dimethylaminophenyl)-5-methoxy-
  4-pyrimidinecarboxamide
N-phenyl 2-(p-nitrophenyl)-5-hydroxy-4-pyrimidine-
  carboxamide
N-piperazino 2-(3,4,5-trimethoxyphenyl)-5-acetoxy-
  4-pyrimidinecarboxamide
2-(2,6-dichlorophenyl)-5-benzyloxy-4-pyrimidine-
  carboxamide
2-(p-methylthiophenyl)-5-hydroxy-4-pyrimidine-
  carboxamide
N-methyl 2-(p-fluorophenyl)-4-acetoxy-5-pyrimidine-
  carboxamide
N,N-dibenzyl 2-(p-fluorophenyl)-4-hydroxy-5-
  pyrimidinecarboxamide
2-(p-methylsulfonylphenyl)-4-propoxy-5-pyrimidine-
  carboxamide
N-pyrrolidino 2-(3,4-dimethylphenyl)-4-phenoxy-5-
  pyrimidinecarboxamide
2-(p-fluorophenyl)-4-hydroxy-5-pyrimidine-
  carboxamide The following representative examples illustrate the interconversion or introduction of functional groups which can be accomplished at various stages of the preparation of the final products.

Methyl 2-(p-methylthiophenyl)-4-hydroxy-5-pyrimidinecarboxylate

A mixture of methyl 2-p-mercaptophenyl)-4-hydroxy-5-pyrimidinecarboxylate (0.01 mole) in a deaerated aqueous KOH solution (0.01 mole) is treated with dimethylsulfate (0.012 mole) at room temperature over one hour, the mixture acidified, extracted well with ether, and the dried ether extracts chromatographed on a silica gel column using an ether-petroleum ether system (v./v. 0–30% ether) as eluant yielding methyl 2-(p-methylthiophenyl)-4-hydroxy-5-pyrimidinecarboxylate.

2-(p-methylsulfinylphenyl)-5-acetoxy-4-pyrimidinecarboxylic acid

To an ice-cooled solution of 2-(p-methylthiophenyl)-5-acetoxy-4-pyrimidinecarboxylic acid (0.01 mole) in methanol-acetone is added a solution of sodium metaperiodate (0.01 mole) in a minimum of water, and the mixture stirred at 0–8% C. until precipitation of sodium iodate is completed. The iodate is removed by filtration, the solvents removed in vacuo, and the residue taken up in chloroform and ether. The combined organic extracts are dried, filtered and concentrated. Purification of the 2-(p-methylsulfinylphenyl)-5-acetoxy-4-pyrimidinecarboxylic acid is effected via recrystallization or chromatography (silica gel) of its methyl ester.

We claim:
1. 2 - (p-fluorophenyl)-5-hydroxy-4-pyrimidine-carboxylic acid.
2. 2 - (p-fluorophenyl)-5-acetoxy-4-pyrimidine-carboxylic acid.
3. 2 - (p-fluorophenyl)-4-hydroxy-5-pyrimidine-carboxylic acid.
4. 2 - (p-fluorophenyl)-4-acetoxy-5-pyrimidine-carboxylic acid.

References Cited

Brown, "The Pyrimidines," 1962, Interscience, pp. 592, 595–96.

Brown, "The Pyrimidines—Supplement I," Interscience 1970, p. T211.

ALEX MAZEL, Primary Examiner

R. V. RUSH, Assistant Examiner

U.S. Cl. X.R.

260—256.4 C, 256.5 R; 424—251